Sept. 30, 1958 M. ARDITI 2,854,645

WIDE BAND WAVEGUIDE CIRCUITRY

Filed Aug. 27, 1956 4 Sheets-Sheet 1

INVENTOR
MAURICE ARDITI
BY Percy P. Lantzy
ATTORNEY

Sept. 30, 1958 M. ARDITI 2,854,645

WIDE BAND WAVEGUIDE CIRCUITRY

Filed Aug. 27, 1956 4 Sheets-Sheet 2

INVENTOR
MAURICE ARDITI
BY [signature]
ATTORNEY

Sept. 30, 1958 M. ARDITI 2,854,645

WIDE BAND WAVEGUIDE CIRCUITRY

Filed Aug. 27, 1956 4 Sheets-Sheet 3

INVENTOR
MAURICE ARDITI
BY Percy P. Lantzy
ATTORNEY

Sept. 30, 1958 M. ARDITI 2,854,645

WIDE BAND WAVEGUIDE CIRCUITRY

Filed Aug. 27, 1956 4 Sheets-Sheet 4

INVENTOR
MAURICE ARDITI
BY Percy P. Lantzy
ATTORNEY

United States Patent Office 2,854,645

Patented Sept. 30, 1958

2,854,645

WIDE BAND WAVEGUIDE CIRCUITRY

Maurice Arditi, Clifton, N. J., assignor to International Telephone and Telegraph Corporation, Nutley, N. J., a corporation of Maryland Application August 27, 1956, Serial No. 606,333

7 Claims. (Cl. 333—97)

This invention relates to wide band waveguide circuitry for high radio frequency energy.

A form of high frequency waveguide known as Microstrip is of special interest because of its wide band characteristics. The patent to D. D. Grieg and H. F. Engelmann No. 2,721,312 discloses a line configuration of Microstrip. This type of line or waveguide comprises two conductors, the first being narrow and sometimes referred to as the line conductor and the second conductor being at least twice as wide as the first conductor and sometimes referred to as the ground conductor. In the preferred form, the conductors are flat in configuration and are carried on opposite sides of a layer of dielectric material. By this parallel arrangement of wide and narrow conductors, microwaves can be easily propagated therealong in a mode closely approximating the TEM mode. In this mode of propagation, the electromagnetic field is highly concentrated between the opposing surfaces of the two conductors and is substantially non-existent on the side of the wide "ground" conductor away from the line conductor.

One of the objects of this invention is to provide in a Microstrip type of waveguide an inversion transition. Another object is to provide a Microstrip circuit assembly utilizing the aforementioned inversion transition so that the ground conductor may be arranged as desired to shield one part of the circuitry and components from other parts thereof. Still another object is to provide a wide band Microstrip hybrid ring employing an inversion transition therein.

One of the features of this invention is the manner in which the inversion transition is formed in the Microstrip waveguide. This is accomplished by inverting the line at the point of transition. This transition comprises the conversion of the second or wide conductor into the first or narrow conductor, and on the opposite side of the layer of dielectric the first or narrow conductor is converted into the second or wide conductor. By making this conversion directly opposite each other on opposite sides of the dielectric, prohibitive mismatch is avoided. Still less discontinuity is obtained by tapering the wide conductors toward the point of transition.

Where the wide conductors are utilized for shielding purposes, the wide conductors are extended as desired and utilized as the ground support for the components associated therewith, the components, of course, being located away from the transition and well within the confines of the wide ground conductor. By utilizing the transition, the components of one section may be located on one side of the layer of dielectric while components of another section are on the opposite side of the layer.

A Microstrip hybrid ring may be made in the order of one wavelength (λ) by utilizing the inversion transition hereinbefore described. Furthermore the Microstrip ring may be twisted to produce a phase reversal transition whereby a broad band hybrid ring is obtained.

A further object of the present invention is the provision of a phase reversal transition which may be used in Microstrip generally, and for example in the hybrid ring as pointed out above.

The above-mentioned and other features and objects of this invention will become more apparent by reference to the following description taken in conjunction with the accompanying drawings, in which.

Figures 1, 2, 3, 9:
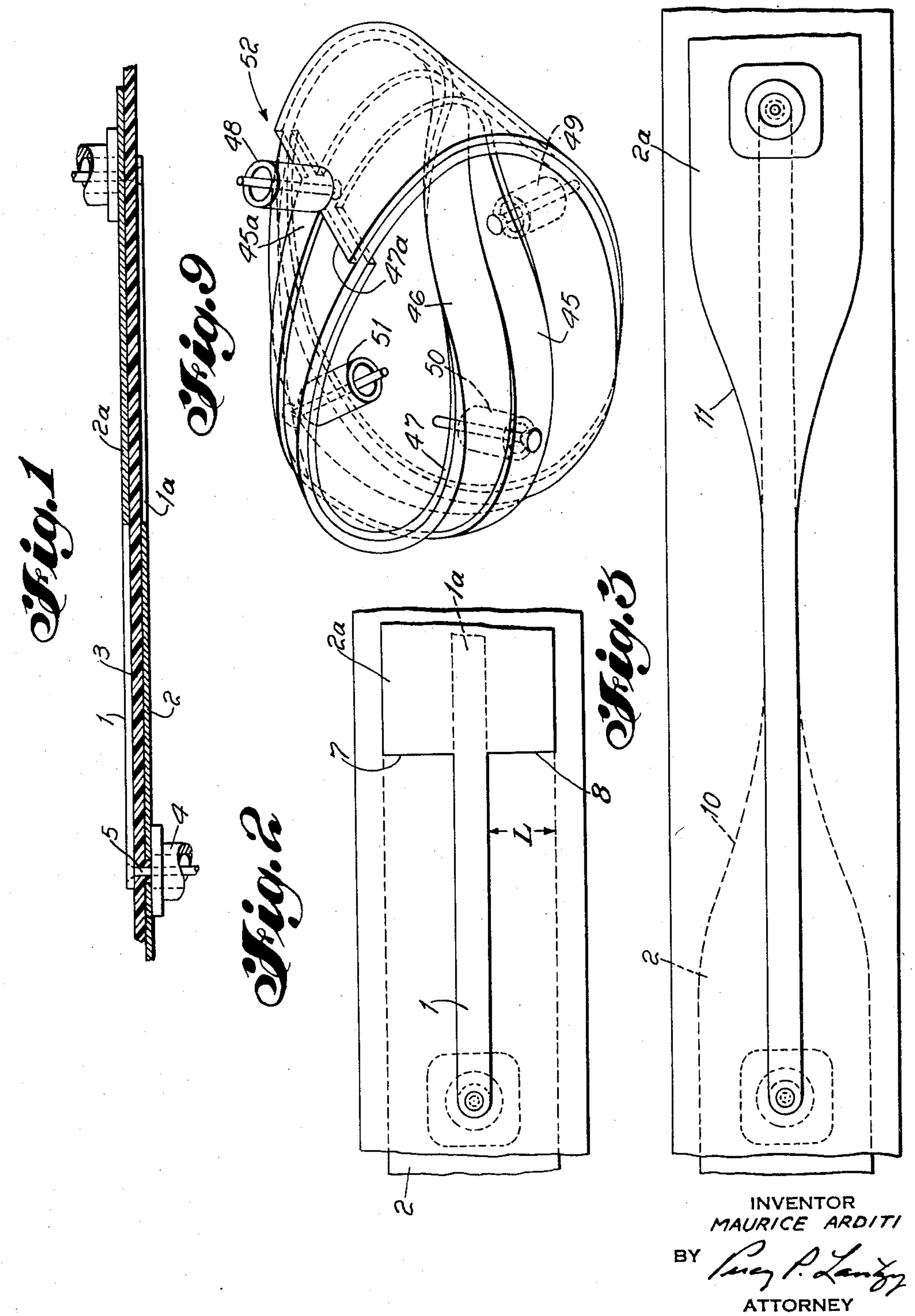
Fig. 1 is a longitudinal cross-sectional view of a Microstrip waveguide containing an inversion transition.
Fig. 2 is a plan view of the Microstrip line of Fig. 1.
Fig. 3 is a plan view of a Microstrip section containing a transition similar to that shown in Fig. 1 except that the wider conductors are tapered toward the point of transition.
Figure 6:
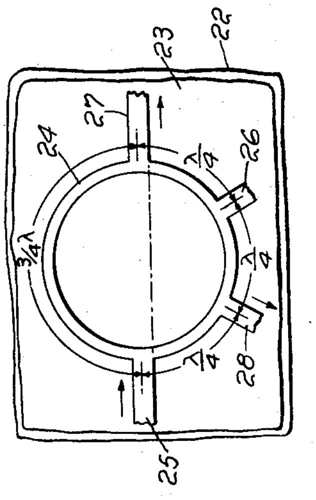
Figure 10:
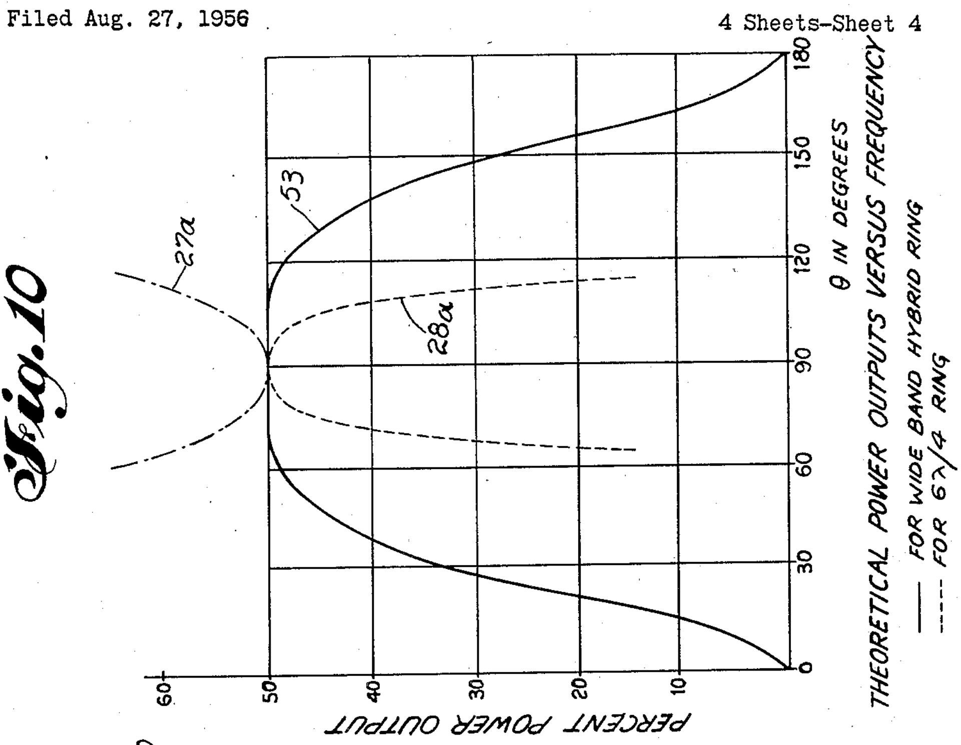
Figure 7:
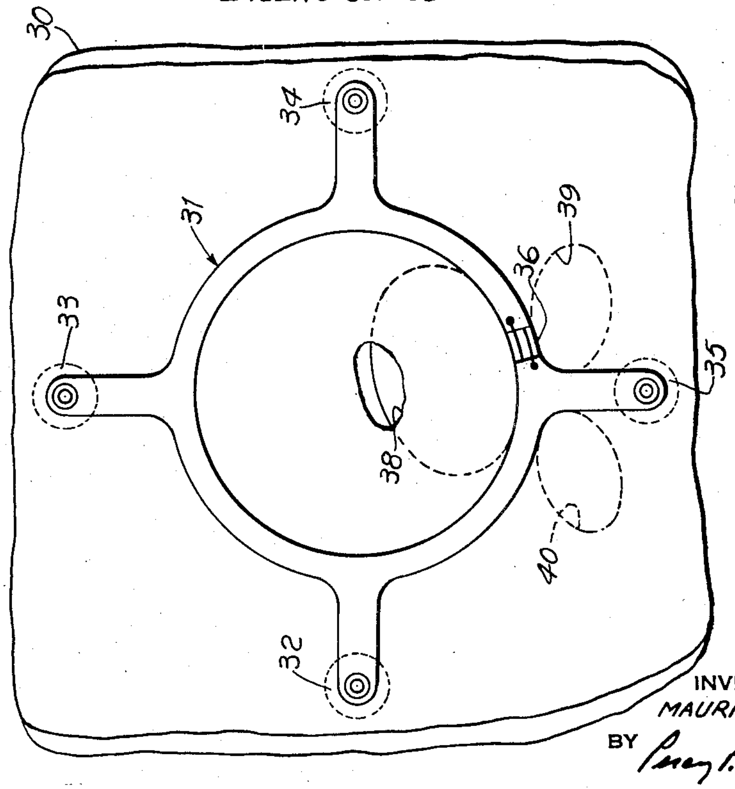
Figure 8:
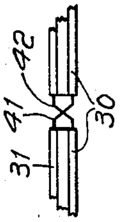

Fig. 6 shows in plan view a Microstrip hybrid ring according to that disclosed in U. S. Patent No. 2,749,521;

Fig. 7 shows an improved Microstrip hybrid ring containing a phase reversal transition;

Fig. 8 is a fragmentary view of the ring shown in Fig. 7 taken along line 8—8 thereof;

Fig. 9 is a perspective view of a Microstrip hybrid ring containing a phase reversal transition; and Fig. 10 is a set of curves useful in explaining the hybrid rings shown in Figs. 6 and 7.

Figure 4:
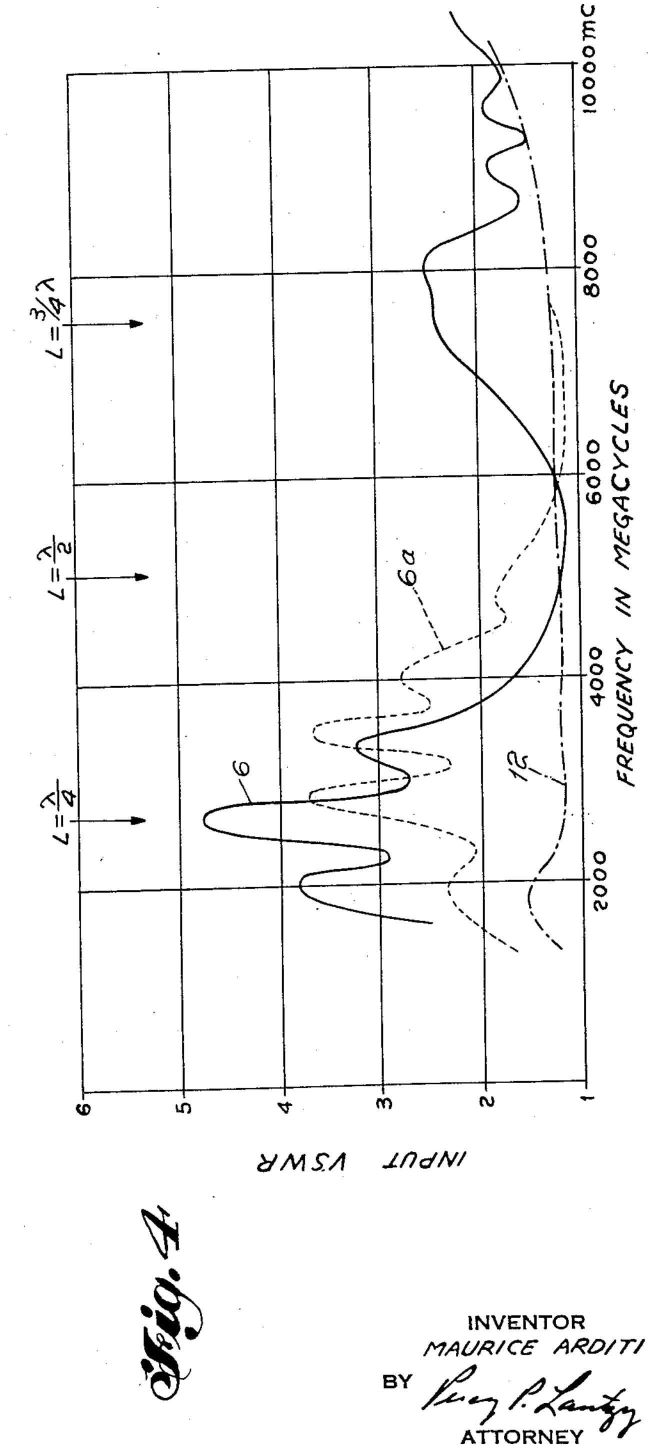
Fig. 4 is a set of curves useful in explaining the advantages of the transitions shown in Figs. 1, 2 and 3.

Referring to Figs. 1 and 2, the Microstrip waveguide is shown to comprise a first or line conductor 1 and a second or ground conductor 2 separated by a layer of dielectric material 3 such as fiberglass impregnated with "Teflon." The conductive material may be applied to the dielectric layer 3 by any known printing technique desired. Where the Microstrip waveguide is employed in conjunction with coaxial lines, the coaxial line is preferably coupled thereto through the ground conductor 2 as indicated by the connection of the outer conductor 4 to the face of the ground conductor 2. The ground conductor is provided with an opening therethrough through which the inner conductor 5 extends for connection to the line conductor 1. The reversal transition comprises a physical conversion of the line conductor 1 into the wider conductor as indicated at 2*a*. On the opposite side of the layer of dielectric, the wider conductor 2 is converted into the narrower conductor as indicated at 1*a*. By making the two conversions directly opposite each other, the step discontinuities 7 and 8 presented by the conversion between narrow and wide conductors do not introduce appreciable mismatch as long as the width of the second conductors 2 and 2*a* is not an odd multiple of $\lambda/4$ where $$\lambda \approx \frac{3.10^{10}}{f\sqrt{\epsilon}}$$

wherein λ is in centimeters, $f$ is in cycles per second and $\epsilon$ is the dielectric constant of the dielectric material 3. The curve 6, Fig. 4, illustrates experimental data obtained in connection with this formula for the configuration shown in Figs. 1 and 2 except that the dielectric layer in the test model was of the same width as the ground conductors 2 and 2*a*. Curve 6*a*, however, was obtained from test data taken with a model in which the dielectric layer was greater (51 mm.) than the ground conductors (38 mm.). The line conductor in each instant was 5.5 mm. in width.

Fig. 3 shows an improved transition wherein the conductors 2 and 2a are tapered as indicated at 10 and 11 toward the transition. This taper completely minimizes the effect of the step discontinuities shown in Fig. 2. Referring to the curves in Fig. 4, it will be noted that the curve 12, which represents test data taken in connection with the transition shown in Fig. 3, shows an extremely low input VSWR (voltage standing wave ratio). As shown, this ratio for the transition of Fig. 3 was below 1.2 from 2,000 to 8,000 megacycles.

Figure 5:
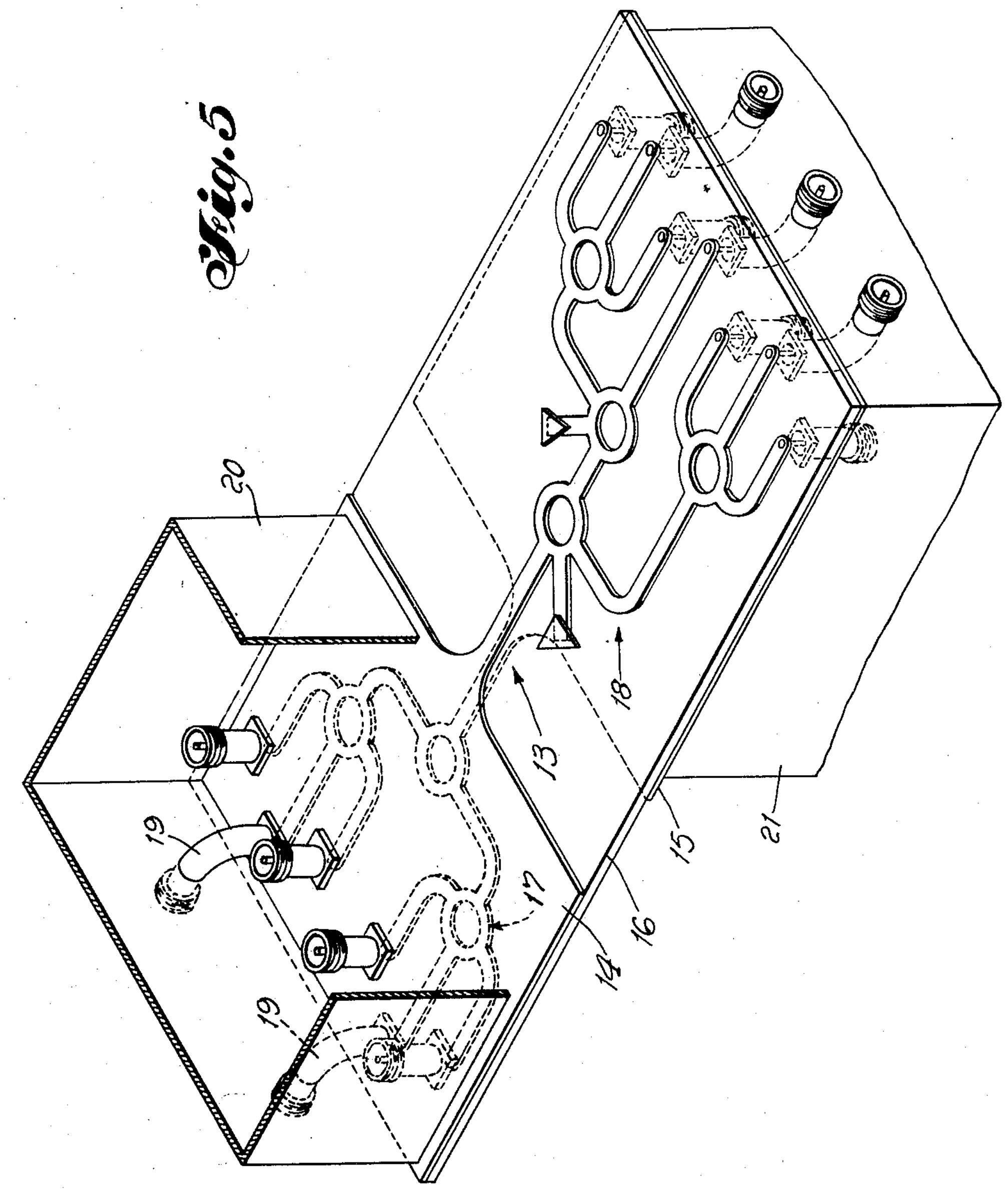
Fig. 5 shows in perspective a circuit assembly employing an inversion transition between two parts of the Microstrip portions thereof so that the wider conductors of the two sections may be utilized for shielding and ground support for certain of the components associated therewith.

Referring to Fig. 5, a transition according to Fig. 3 is shown employed in the chassis of a circuit assembly. This intersection is indicated at 13. The wide second conductor is shown extended laterally to comprise plates 14 and 15 on opposite sides of the dielectric layer 16. Opposite the plate 14 is shown an R.-F. Microstrip circuit 17 while opposite the plate 15 is another Microstrip circuit 18. These circuits as indicated may include hybrid rings and be coupled to certain components such as crystals, resonant cavities, loads, or to coaxial couplings as indicated at 19. If desired, the components may be further enclosed by a shield housing as indicated at 20 and 21. In this arrangement, the two plates 14 and 15 provide effective shields with respect to components and circuitry associated therewith with respect to the components and circuitry associated with the other plate. Fig. 5 is a fragmentary portion of a radio frequency control circuit.

Fig. 6 shows the hybrid ring of H. F. Engelmann and J. A. Kostriza Patent No. 2,749,521, the ring being in the order of 6/4λ. This hybrid ring comprises a planar conductor 22, a layer of dielectric 23 and a line conductor in the form of a ring 24 having branches 25, 26, 27 and 28 spaced as indicated. This ring is shown to have a wide band characteristic according to curve 27a and 28a in Fig. 10. Assuming power is applied over connection 25, the power would divide between branches 27 and 28 with no outputs at branch 26. Referring to Fig. 10, $\theta$ is the length in electrical degrees of the distance between branches 25 and 28 and may be expressed by the formula $$\theta=2\pi\frac{L}{\lambda}=\frac{2\pi L}{v}f$$

where L is the distance between branches 25 and 28, $\lambda$ is the wavelength, $v$ is the phase velocity and $f$ is the frequency. This wide band characteristic may be widened still further by converting the 6/4λ ring into a λ ring.

In other rings, such as coaxial and parallel wire hybrid rings, a wider band has been achieved by using a λ ring in place of 6/4λ ring together with 180° phase reversal at one junction. A similar effect can be achieved with a Microstrip hybrid ring. This may be done by either of the two arrangements disclosed in Figs. 7 and 9. In Fig. 7 the hybrid ring comprises a ground conductor 30 and a ring or line conductor 31. The hybrid ring is provided with four connections 32, 33, 34 and 35 at points spaced about the ring 1/4λ apart. In the section between connections 34 and 35, I show a cross linked 180° phase reversal transition 36. This transition is formed by cutting out parts of the conductor 30 as indicated at 38, 39 and 40 so that the ground conductor 30 approaches a line configuration corresponding to that of the ring conductor 31 at the transition. The two conductors 30 and 31 are terminated a short distance from each other and two cross connections are made by wire conductors 41 and 42 through the dielectric as indicated in Fig. 8. The conductor 41, for example, connects the end of the ring conductor 31 to the end of the ground conductor 30, and wire 42 connects the other end of ring conductor 31 to the other end of ground conductor 30. By this arrangement of two narrow conductors in the section between connections 34 and 35, a phase reversal is obtained without introducing any appreciable discontinuity. By shaping the ground conductor 30 down to the size of the ring conductor at the transition, no appreciable discontinuity is experienced. The characteristic impedance of the line in the ring section is 1.4 times its characteristic impedance of the line in the branch arm.

In Fig. 9, I show a λ ring of Microstrip similar to that shown in Fig. 7, except the 180° phase reversal is obtained by twisting the ring section and connecting the conductors together in inverted relation at one junction made according to that shown in Figs. 1 and 2. More specifically, the Microstrip includes a narrow or line conductor 45, a layer of dielectric material 46 and a wide ground conductor 47. The four connections 48, 49, 50 and 51 are connected to the line conductor at points spaced along the ring 1/4λ apart. At the transition 52, the end of the line conductor as indicated at 45a is changed into the wide ground conductor as indicated at 47a. It will be noted that the connections 48—51 are made through the wide ground conductor, the inner conductor of the connections being connected directly to the line conductor. While the ring of Fig. 9 is referred to as a single wavelength (λ) ring, it should be understood that this is intended as the minimum size since larger rings having the same wavelength ratio may be made. Curve 53, Fig. 10 shows the percent of power output versus $\theta$ for branches 50 and 52 when the input power is fed at branch 51. This curve is also the same for the ring of Fig. 7, wherein the input branch would be 33 and the output branches would be 32 and 34. It is obvious from this curve that the output is more constant over a wider band of frequencies than over the 6/4λ type of ring shown in Fig. 6 and represented by curves 27a and 28a.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a high frequency waveguide of the type comprising first and second conductors and a layer of dielectric material separating said conductors in spaced substantially parallel relation a small fraction of a wavelength apart, said second conductor being of a planar configuration and at least twice as wide as said first conductor whereby high frequency energy propagated therealong presents an electric field closely approximating the TEM mode, a transition comprising an inversion of the waveguide conductors wherein the width of said first conductor on one side of said dielectric layer is converted into the greater width of said second conductor and the width of said second conductor on the opposite side of said layer of dielectric material is converted into the smaller width of said first conductor.

2. A high frequency waveguide according to claim 1, wherein the wider conductors on opposite sides of the transition are tapered down to the size of said narrower conductor.

3. A high frequency waveguide according to claim 1, wherein the wider conductors on opposite sides of the transition are extended laterally to form relatively wide conductive plates, components and circuitry are associated with each of said plates on opposite sides of said waveguide outside the electric field between said first and second conductors so that said plates constitute shielding between the components and circuitry associated with the other of the plates.

4. A high frequency waveguide according to claim 1, wherein the waveguide is in the form of an endless loop in the order of one wavelength having four 1/4λ sections and the transition is located in one of the 1/4λ sections thereof.

5. A high frequency waveguide according to claim 4, wherein said loop is twisted 180 degrees with respect to said transition thereby providing 180° electrical phase reversal in said loop.

6. A high frequency waveguide according to claim 4, wherein said first and second conductors are each provided with a gap therein at said transition and the ends thereof are cross-connected diagonally through said layer of dielectric.

7. A high frequency waveguide according to claim 6, wherein the gap in said second conductor comprises openings therein on opposite sides of said first conductor, said openings being disposed with their adjacent edges spaced apart substantially the width of said first conductor thereby providing a matched junction over a wide band of frequencies.

References Cited in the file of this patent

UNITED STATES PATENTS 2,754,484 Adams ---------------- July 10, 1956